(12) United States Patent
Van Deventer et al.

(10) Patent No.: US 11,760,505 B2
(45) Date of Patent: Sep. 19, 2023

(54) AIRCRAFT TOW VEHICLES AND METHODS OF TOWING AN AIRCRAFT

(71) Applicant: The Boeing Company, Chicago, IL (US)

(72) Inventors: Bruce Van Deventer, Lynnwood, WA (US); Nima Forghani, Seattle, WA (US)

(73) Assignee: The Boeing Company, Chicago, IL (US)

( * ) Notice: Subject to any disclaimer, the term of this patent is extended or adjusted under 35 U.S.C. 154(b) by 834 days.

(21) Appl. No.: 16/597,778

(22) Filed: Oct. 9, 2019

(65) Prior Publication Data

US 2021/0107683 A1    Apr. 15, 2021

(51) Int. Cl.
| | |
|---|---|
| *B64F 1/22* | (2006.01) |
| *B64F 1/10* | (2006.01) |
| *B64F 1/00* | (2006.01) |
| *B64F 1/04* | (2006.01) |

(52) U.S. Cl.
CPC ............ *B64F 1/228* (2013.01); *B64F 1/002* (2013.01); *B64F 1/04* (2013.01); *B64F 1/10* (2013.01); *B64F 1/227* (2013.01)

(58) Field of Classification Search
CPC .... B64F 1/228; B64F 1/10; B64F 1/04; B64F 1/002
See application file for complete search history.

(56) References Cited

U.S. PATENT DOCUMENTS

| | | | |
|---|---|---|---|
| 2,751,990 A | | 6/1956 | Finlay et al. |
| 2,987,133 A | * | 6/1961 | Clifton ................ B64F 1/22 280/405.1 |
| 4,007,890 A | | 2/1977 | Bremer et al. |
| 7,445,178 B2 | | 11/2008 | McCoskey et al. |
| 10,179,645 B2 | * | 1/2019 | Cox .................. B64C 25/405 |
| 2005/0017129 A1 | * | 1/2005 | McDonnell ............ B64F 1/02 244/110 G |
| 2005/0253020 A1 | * | 11/2005 | McCoskey ............ B64F 1/305 244/137.1 |
| 2010/0314180 A1 | * | 12/2010 | Ziv-Av .................. B64F 1/228 280/62 |
| 2011/0073388 A1 | * | 3/2011 | Andres .................. B64F 1/22 244/50 |
| 2011/0073706 A1 | * | 3/2011 | Katsumata ............ B64F 1/22 244/50 |
| 2013/0087654 A1 | * | 4/2013 | Seibt .................... H02J 7/14 244/50 |
| 2015/0217861 A1 | * | 8/2015 | Cox .................... F16D 41/16 301/6.2 |

(Continued)

FOREIGN PATENT DOCUMENTS

| | | | | |
|---|---|---|---|---|
| DE | 102013020337 A1 | * | 5/2015 | ........... B64C 25/405 |
| DE | 102019120087 A1 | * | 1/2021 | |
| WO | WO-2018206983 A1 | * | 11/2018 | |

*Primary Examiner* — Donald J Wallace
*Assistant Examiner* — Jalal C Coduroglu
(74) *Attorney, Agent, or Firm* — Yee & Associates, P.C.

(57) ABSTRACT

An aircraft tow vehicle and methods of towing an aircraft are disclosed. An aircraft tow vehicle comprises an aircraft structural interface configured to couple to a wheel assembly of a main landing gear of an aircraft; and an aircraft towing propulsive force system configured to propel the aircraft forward when the aircraft structural interface is coupled to the wheel assembly.

20 Claims, 9 Drawing Sheets

(56) References Cited

U.S. PATENT DOCUMENTS

| | | | |
|---|---|---|---|
| 2016/0016658 A1* | 1/2016 | Walitzki | B64C 25/405 |
| | | | 244/50 |
| 2016/0185452 A1* | 6/2016 | Cox | B64F 1/002 |
| | | | 244/50 |
| 2016/0347477 A1* | 12/2016 | Tully | B64F 1/08 |
| 2017/0021921 A1* | 1/2017 | Cox | B64F 1/08 |
| 2017/0267377 A1* | 9/2017 | Rheaume | B64F 1/225 |
| 2019/0202579 A1* | 7/2019 | Costello | B64F 1/36 |
| 2019/0263509 A1* | 8/2019 | Didey | B64F 1/305 |
| | | | 244/137.1 |
| 2019/0308749 A1* | 10/2019 | Gulli | B64F 1/225 |
| 2021/0016898 A1* | 1/2021 | Douglass | B64F 1/08 |

* cited by examiner

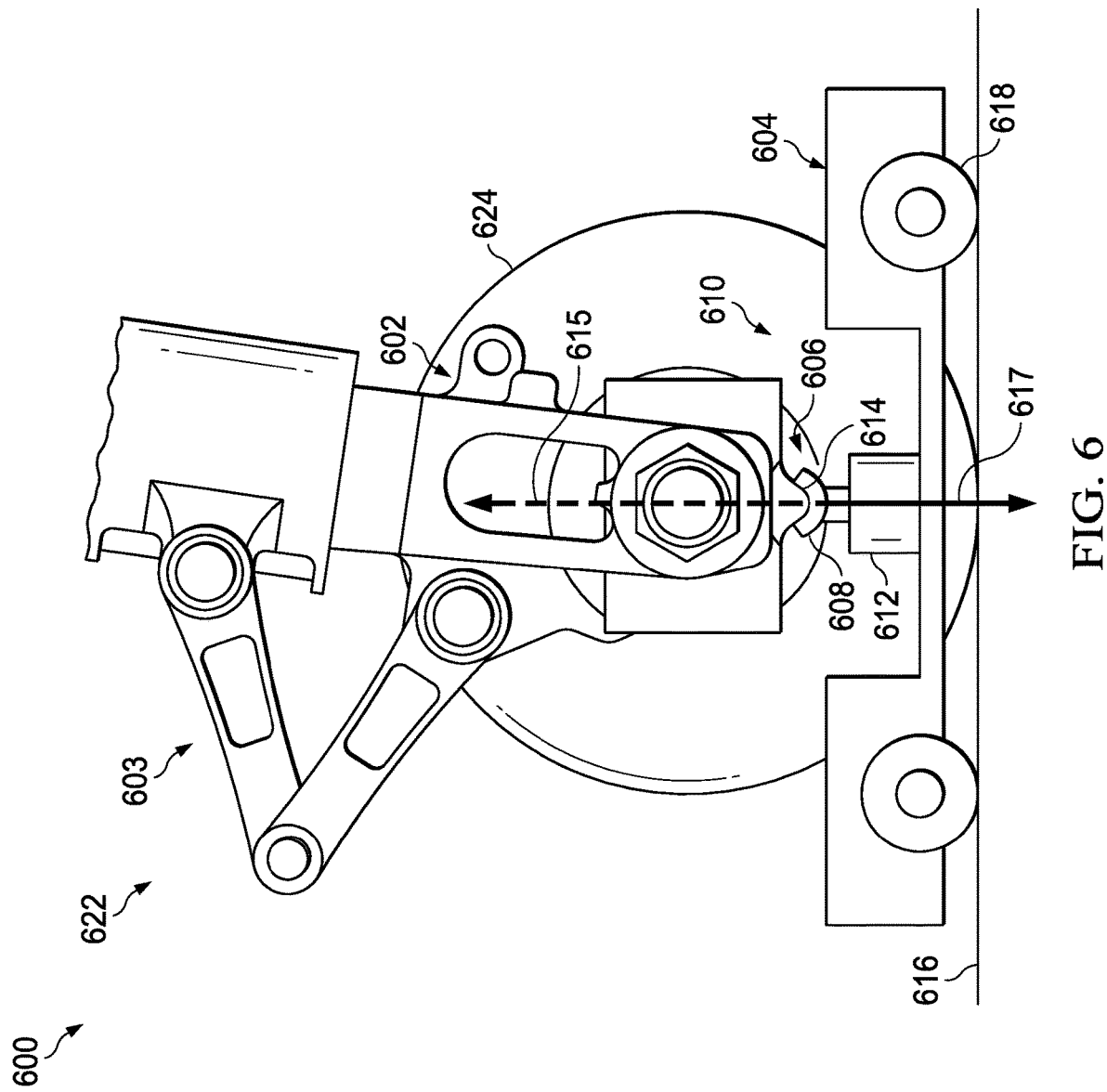

AIRCRAFT TOW VEHICLES AND METHODS OF TOWING AN AIRCRAFT

BACKGROUND INFORMATION

1. Field

The present disclosure relates generally to aircraft and, more specifically, to towing an aircraft.

2. Background

To tow an aircraft, an aircraft tow vehicle connects to the nose landing gear of the aircraft. Current aircraft tow vehicles include aircraft tow vehicles with tow bars and towbarless vehicles. Tow bars are connected to the nose landing gear, while towbarless vehicles lift and carry the nose landing gear. Towing an aircraft may also be referred to as "pushback." The aircraft tow vehicle may also be referred to as a "tractor" or a "tug."

An aircraft tow vehicle is heavy to provide traction. An aircraft tow vehicle can weigh up to over 100,000 pounds. Due to their size and weight, conventional aircraft tow vehicles may be undesirably difficult to maneuver and maintain.

Therefore, it would be desirable to have a method and apparatus that takes into account at least some of the issues discussed above, as well as other possible issues.

SUMMARY

An illustrative embodiment of the present disclosure provides a method of towing an aircraft. A number of aircraft tow vehicles is coupled to main landing gear of an aircraft. The aircraft is propelled using the number of aircraft tow vehicles.

Another illustrative embodiment of the present disclosure provides a method of towing an aircraft. An aircraft structural interface of a first aircraft tow vehicle is coupled to a first wheel assembly of a main landing gear of an aircraft. An aircraft structural interface of a second aircraft tow vehicle is coupled to a first wheel assembly of a main landing gear of an aircraft. The aircraft is propelled using the first aircraft tow vehicle and the second aircraft tow vehicle.

Yet another illustrative embodiment of the present disclosure provides an aircraft tow vehicle. The aircraft tow vehicle comprises an aircraft structural interface configured to couple to a wheel assembly of a main landing gear of an aircraft, and an aircraft towing propulsive force system configured to propel the aircraft forward when the aircraft structural interface is coupled to the wheel assembly.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 is an illustration of a side view of an aircraft tow vehicle connected to a wheel assembly of a main landing gear of an aircraft in accordance with an illustrative embodiment;

DETAILED DESCRIPTION

The illustrative examples recognize and take into account one or more different considerations. The illustrative examples recognize and take into account that it would be desirable to have a more nimble and faster aircraft tow vehicle. The illustrative examples recognize and take into account that it would be desirable to have a smaller aircraft tow vehicle. The illustrative examples recognize and take into account that traditional aircraft towing vehicles "pull" the aircraft by the nose landing gear.

Figure 1:
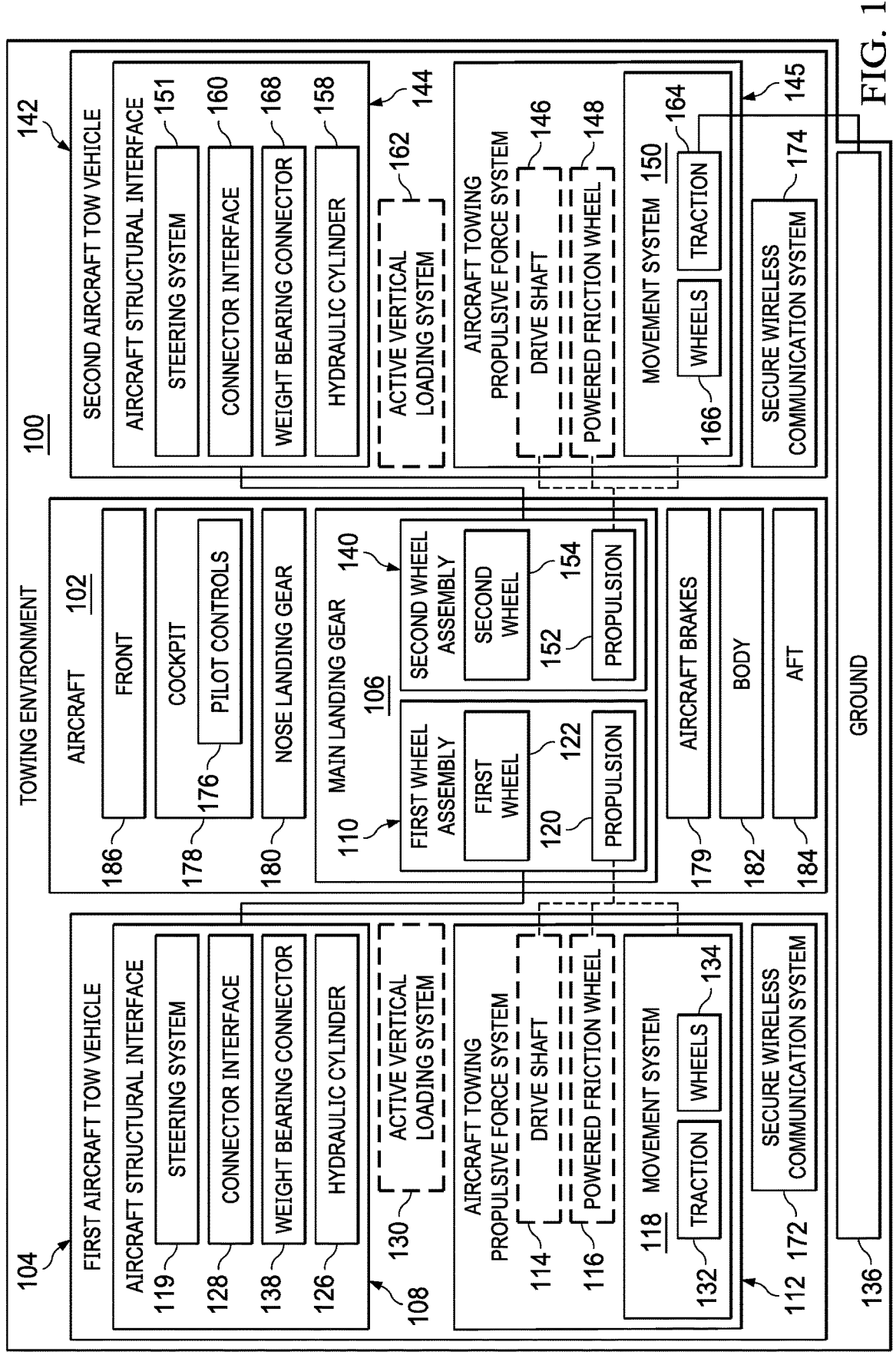
FIG. 1 is an illustration of a block diagram of a towing environment in which an illustrative embodiment may be implemented.

Turning now to FIG. 1, an illustration of a block diagram of a towing environment is depicted in accordance with an illustrative embodiment. Aircraft 102 is towed within towing environment 100 using first aircraft tow vehicle 104. First aircraft tow vehicle 104 is self-propulsive. First aircraft tow vehicle 104 is configured to be connected to main landing gear 106 of aircraft 102. First aircraft tow vehicle 104 comprises aircraft structural interface 108 configured to couple to a wheel assembly, first wheel assembly 110, of main landing gear 106 of aircraft 102, and aircraft towing propulsive force system 112 configured to propel aircraft 102 forward when aircraft structural interface 108 is coupled to the wheel assembly. Aircraft structural interface 108 is a mechanical connector.

Aircraft towing propulsive force system 112 is configured to propel aircraft 102 by driving a wheel of first wheel assembly 110 or driving first aircraft tow vehicle 104. Towing of aircraft 102 is performed by "pulling" aircraft by first aircraft tow vehicle 104 or by providing power to components of aircraft by first aircraft tow vehicle 104. In some illustrative examples, aircraft towing propulsive force system 112 comprises one of drive shaft 114, powered friction wheel 116, or movement system 118 of first aircraft tow vehicle 104. Drive shaft 114 may be referred to as a motor driven insertable drive shaft.

Movement system 118 is a propulsive system for first aircraft tow vehicle 104. First aircraft tow vehicle 104 has its own independent movement and steering provided by movement system 118 and steering system 119. Movement system 118 provides independent movement for first aircraft tow vehicle 104 within towing environment 100. First aircraft tow vehicle 104 has movement system 118 and steering system 119 so that first aircraft tow vehicle 104 can maneuver to engage aircraft 102, provide the tow function, and depart aircraft 102 when the tow operation is complete. In some illustrative examples, the tow function also involves some steering of first aircraft tow vehicle 104.

In some illustrative examples, movement system 118 and steering system 119 provide a castering capability. In some illustrative examples, castering by first aircraft tow vehicle 104 facilitates turning while limiting scrubbing wear of tires of first wheel assembly 110.

Steering system 119 provides stability to first aircraft tow vehicle 104 in directions of movement. In some illustrative examples, steering system 119 also provides stability during castering. In some illustrative examples, when applying a normal force and positioned beneath a lift point, first aircraft tow vehicle 104 is neutrally stable. In some illustrative examples, when applying a normal force and positioned forward or aft of a lift point, first aircraft tow vehicle 104 is not neutrally stable and steering system 119 provides stability.

Aircraft 102 is propelled by a number of aircraft tow vehicles. As depicted, the number of aircraft tow vehicles comprises first aircraft tow vehicle 104 and second aircraft tow vehicle 142.

In some illustrative examples, propelling aircraft 102 using the number of aircraft tow vehicles comprises propelling a number of wheels, first wheel 122 and second wheel 154, of main landing gear 106 by applying force to a respective driving system of each of the number of wheels or applying force directly to tires of each of the number of wheels. When propelling aircraft 102 using the number of aircraft tow vehicles comprises propelling a number of wheels of main landing gear 106 by applying force to a respective driving system of each of the number of wheels using a respective drive shaft, drive shaft 114 and drive shaft 146, of each aircraft tow vehicle, first aircraft tow vehicle 104 and second aircraft two vehicle 142, of the number of aircraft tow vehicles.

When aircraft towing propulsive force system 112 comprises drive shaft 114, drive shaft 114 is used to drive a gear of first wheel assembly 110. Drive shaft 114 driving the gear of first wheel assembly 110 provides propulsion 120 to first wheel 122. In this illustrative example, propulsion 120 provided by driving the gear of first wheel assembly 110 comprises drive torque provided to first wheel 122.

The drive gearbox of first wheel assembly 110 has any desirable design. In some illustrative examples, the drive gearbox is a ring and pinion design.

After connecting first aircraft tow vehicle 104 to main landing gear 106, drive shaft 114 is extended to engage a gear or gearbox of first wheel assembly 110. A motor (not depicted) of first aircraft tow vehicle 104 drives drive shaft 114 while drive shaft 114 is in contact with a pinion gear, a ring gear on first wheel 122 or in a gearbox for a driven axle design.

In some illustrative examples, propelling aircraft 102 using the number of aircraft tow vehicles, first aircraft tow vehicle 104 and second aircraft tow vehicle 142, comprises propelling a number of wheels, first wheel 122 and second wheel 154, of main landing gear 106 by applying force directly to tires of each of the number of wheels using a powered friction wheel, powered friction wheel 116 and powered friction wheel 148, of each aircraft tow vehicle of the number of aircraft tow vehicles. When aircraft towing propulsive force system 112 comprises powered friction wheel 116, powered friction wheel 116 provides friction directly to a tire of first wheel 122. Providing friction directly against a tire of first wheel 122 provides drive torque to first wheel 122. Powered friction wheel 116 providing drive torque to first wheel 122 provides propulsion 120 to first wheel 122. Powered friction wheel 116 is pressed substantially against a tire of first wheel 122 to provide propulsion 120 to first wheel 122.

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Aircraft structural interface 108 takes any desired form. In some illustrative examples, aircraft structural interface 108 comprises hydraulic cylinder 126. Hydraulic cylinder 126 controls the distance of first aircraft tow vehicle 104 from first wheel assembly 110. Although hydraulic cylinder 126 is depicted, aircraft structural interface 108 includes any desired distance control mechanism. When present, hydraulic cylinder 126 extends connector interface 128 to connect to first wheel assembly 110. Connector interface 128 takes any desirable form such as a hook, a socket, a universal joint, a quick connector, or any other desirable interface.

In some illustrative examples, when aircraft towing propulsive force system 112 comprises powered friction wheel 116, hydraulic cylinder 126 pulls on connector interface 128 after connecting to first wheel assembly 110. By pulling on connector interface 128, powered friction wheel 116 is pressed against a tire of first wheel 122.

In some illustrative examples, aircraft towing propulsive force system 112 comprises movement system 118 of first aircraft tow vehicle 104. In these illustrative examples, aircraft towing propulsive force system 112 comprises movement system 118 configured to drive first aircraft tow vehicle 104 across ground 136. Ground 136 can take the form of a runway, a taxiway, or any other desirable area first aircraft tow vehicle 104 will traverse. In these illustrative examples, movement system 118 provides propulsion 120 to first wheel 122 by pulling aircraft 102. In these illustrative examples, movement system 118 does not provide drive torque to drive first wheel 122, but instead causes first wheel 122 to rotate by pulling aircraft 102.

In these illustrative examples, first aircraft tow vehicle 104 includes active vertical loading system 130. Active vertical loading system 130 is configured to apply a normal load to main landing gear 106.

Applying a normal load to main landing gear 106 increases traction 132 of wheels 134 on ground 136. By increasing traction 132 of wheels 134 using the available normal force of first aircraft tow vehicle 104, first aircraft tow vehicle 104 has a same towing force with a reduced weight.

In some of these illustrative examples, the normal force is applied to first wheel assembly through aircraft structural interface 108. In these illustrative examples, aircraft structural interface 108 takes the form of weight bearing connector 138. In these illustrative examples, active vertical loading system 130 applies normal force from first aircraft tow vehicle 104 through weight bearing connector 138 to main landing gear 106.

Main landing gear 106 includes first wheel assembly 110 and second wheel assembly 140. In some illustrative examples, first wheel assembly 110 is referred to as a left wheel assembly. First wheel assembly 110 comprises any desirable quantity of wheels. In some illustrative examples, first wheel assembly 110 has two wheels. In some illustrative examples, first wheel assembly 110 has four wheels. In some illustrative examples, second wheel assembly 140 is referred to as a right wheel assembly. Second wheel assembly 140 comprises any desirable quantity of wheels. In some illustrative examples, second wheel assembly 140 has two wheels. In some illustrative examples, second wheel assembly 140 has four wheels.

Second aircraft tow vehicle 142 is connected to second wheel assembly 140. In this illustrative example, aircraft 102 is towed within towing environment 100 using second aircraft tow vehicle 142. Second aircraft tow vehicle 142 is configured to be connected to main landing gear 106 of aircraft 102. Second aircraft tow vehicle 142 comprises aircraft structural interface 144 configured to couple to a wheel assembly, second wheel assembly 140, of main landing gear 106 of aircraft 102, and aircraft towing propulsive force system 145 configured to propel aircraft 102 forward when aircraft structural interface 144 is coupled to the wheel assembly. Aircraft structural interface 144 is a mechanical connector.

Aircraft towing propulsive force system 145 is configured to propel aircraft 102 by driving a wheel of second wheel assembly 140 or driving second aircraft tow vehicle 142. In some illustrative examples, aircraft towing propulsive force system 145 comprises one of drive shaft 146, powered friction wheel 148, or movement system 150 of second aircraft tow vehicle 142. Drive shaft 146 may be referred to as a motor driven insertable drive shaft.

Movement system 150 is a propulsive system for second aircraft tow vehicle 142. Second aircraft tow vehicle 142 has its own independent movement and steering provided by movement system 150 and a steering system (not depicted). Movement system 150 provides independent movement for second aircraft tow vehicle 142 within towing environment 100. Second aircraft tow vehicle 142 has movement system 150 and steering system (not depicted) so that second aircraft tow vehicle 142 can maneuver to engage aircraft 102, provide the tow function, and depart aircraft 102 when the tow operation is complete. In some illustrative examples, the tow function also involves some steering of second aircraft tow vehicle 142.

In some illustrative examples, movement system 150 and steering system 151 provide a castering capability. In some illustrative examples, castering by second aircraft tow vehicle 142 facilitates turning while limiting scrubbing wear of tires of second wheel assembly 140.

Steering system 151 provides stability to second aircraft tow vehicle 142 in directions of movement. In some illustrative examples, steering system 151 also provides stability during castering. In some illustrative examples, when applying a normal force and positioned beneath a lift point, second aircraft tow vehicle 142 is neutrally stable. In some illustrative examples, when applying a normal force and positioned forward or aft of a lift point, second aircraft tow vehicle 142 is not neutrally stable and steering system 151 provides stability.

When aircraft towing propulsive force system 145 comprises drive shaft 146, drive shaft 146 is used to drive a gear of second wheel assembly 140. Drive shaft 146 driving the gear of second wheel assembly 140 provides propulsion 152 to second wheel 154. Drive shaft 146 may be referred to as a motor driven insertable drive shaft.

The drive gearbox of second wheel assembly 140 has any desirable design. In some illustrative examples, the drive gearbox is a ring and pinion design.

When aircraft towing propulsive force system 145 comprises powered friction wheel 148, powered friction wheel 148 provides friction directly to a tire of second wheel 154. Powered friction wheel 148 providing friction to second wheel 154 provides propulsion 152 to second wheel 154. Powered friction wheel 148 is pressed substantially against a tire of second wheel 154 to provide propulsion 152 to second wheel 154.

Aircraft structural interface 144 takes any desired form. In some illustrative examples, aircraft structural interface 144 comprises hydraulic cylinder 158. Hydraulic cylinder 158 controls the distance of second aircraft tow vehicle 142 from second wheel assembly 140. Although hydraulic cylinder 158 is depicted, aircraft structural interface 108 includes any desired distance control mechanism. When present, hydraulic cylinder 158 extends connector interface 160 to connect to second wheel assembly 140. Connector interface 160 takes any desirable form such as a hook, a socket, a universal joint, a quick connector, or any other desirable interface.

In some illustrative examples, aircraft towing propulsive force system 145 comprises movement system 150 of second aircraft tow vehicle 142. In these illustrative examples, aircraft towing propulsive force system 145 comprises movement system 150 configured to drive second aircraft tow vehicle 142 across ground 136.

In these illustrative examples, movement system 150 provides propulsion 152 to second wheel 154 by pulling aircraft 102. In these illustrative examples, movement system 150 does not provide drive torque to drive second wheel 154, but instead causes second wheel 154 to rotate by pulling aircraft 102.

In these illustrative examples, second aircraft tow vehicle 142 includes active vertical loading system 162. Active vertical loading system 162 is configured to apply a normal load to main landing gear 106.

Applying a normal load to main landing gear 106 increases traction 164 of wheels 166 on ground 136. By increasing traction 164 of wheels 166 using a normal force of second aircraft tow vehicle 142, second aircraft tow vehicle 142 has a same towing force with a reduced weight.

In some of these illustrative examples, the normal force is applied to first wheel assembly through aircraft structural interface 144. In these illustrative examples, aircraft structural interface 144 takes the form of weight bearing connector 168. In these illustrative examples, active vertical loading system 162 applies normal force from second aircraft tow vehicle 142 through weight bearing connector 168 to main landing gear 106.

In some illustrative examples, first aircraft tow vehicle 104 and second aircraft tow vehicle 142 are autonomous or semi-autonomous. An autonomous vehicle is one that can maneuver without human intervention. A semi-autonomous vehicle can perform some actions, such as accelerating, braking, or maintaining a path, without human intervention.

In some illustrative examples, first aircraft tow vehicle 104 and second aircraft tow vehicle 142 autonomously drive to aircraft 102 prior to propelling aircraft 102. In some illustrative examples, first aircraft tow vehicle 104 and second aircraft tow vehicle 142 autonomously or semi-autonomously propel aircraft 102. In some illustrative examples, first aircraft tow vehicle 104 and second aircraft tow vehicle 142 autonomously drive away from aircraft 102 after towing aircraft 102 and uncoupling from aircraft 102.

First aircraft tow vehicle 104 and second aircraft tow vehicle 142 work together to tow aircraft 102 within towing environment 100. In some illustrative examples, aircraft towing propulsive force system 112 and aircraft towing propulsive force system 145 are the same type. In some illustrative examples, aircraft towing propulsive force system 112 and aircraft towing propulsive force system 145 are of different types.

First aircraft tow vehicle 104 and second aircraft tow vehicle 142 communicate with each other to provide synchronized movement to aircraft 102. As depicted, first aircraft tow vehicle 104 has secure wireless communication system 172. Secure wireless communication system 172 is configured to communicate with at least one of secure wireless communication system 174 of second aircraft tow vehicle 142 or aircraft 102. In some illustrative examples, secure wireless communication system 172 is configured to send information to a second aircraft tow vehicle, second aircraft tow vehicle 142, and receive information from the second aircraft tow vehicle. In some illustrative examples, first aircraft tow vehicle 104 and second aircraft tow vehicle 142 are maneuverable by pilot controls 176 in a cockpit of aircraft 102. In some illustrative examples, first aircraft tow vehicle 104 and second aircraft tow vehicle 142 are not maneuvered by pilot controls 176 but receive information from aircraft 102. In some illustrative examples, first aircraft tow vehicle 104 and second aircraft tow vehicle 142 receive information regarding braking, turning, or other actions taken by pilots in cockpit 178.

In some illustrative examples, braking during towing is performed by commanding the brake pedals of aircraft 102 to engage aircraft brakes 179 of aircraft 102. In other illustrative examples, braking during towing is performed by ceasing propulsion 120 and propulsion 152 to main landing gear 106. In some illustrative examples, braking during towing is performed by stopping driving torque or moment to wheels of main landing gear 106. In some illustrative examples, braking during towing is performed by stopping driving first aircraft tow vehicle 104 and second aircraft tow vehicle 142 to cease movement of aircraft 102.

In some illustrative examples, first aircraft tow vehicle 104 and second aircraft tow vehicle 142 will cease movement of aircraft 102 without engaging aircraft brakes 179. By ceasing movement of aircraft 102 without applying aircraft brakes 179, the life of aircraft brakes 179 is extended, reducing costs and maintenance time of aircraft 102. In some illustrative examples, when first aircraft tow vehicle 104 and second aircraft tow vehicle 142 stop aircraft 102 by ceasing propulsion 120 and propulsion 152, aircraft brakes 179 are still available for braking using pilot controls 176 if desired.

First aircraft tow vehicle 104 and second aircraft tow vehicle 142 provide towing of aircraft 102 from main landing gear 106 rather than nose landing gear 180. Main landing gear 106 is positioned beneath body 182 and between nose landing gear 180 and aft 184 of aircraft 102. By using first aircraft tow vehicle 104 and second aircraft tow vehicle 142 between front 186 and aft 184 of aircraft 102, normal forces applied from first aircraft tow vehicle 104 and second aircraft tow vehicle 142 may be greater than if applied at front 186.

The illustration of towing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, each of drive shaft 114, powered friction wheel 116, and active vertical loading system 130 are alternative components. When drive shaft 114 is present, powered friction wheel 116 and active vertical loading system 130 need not be present. In some illustrative examples, more than one type of towing propulsive force system of aircraft towing propulsive force system 112 is present.

A number of aircraft tow vehicles connect to main landing gear 106 and tow aircraft 102 in towing environment 100. As used herein, "a number of" items is one or more items. As depicted, the number of aircraft tow vehicles is two aircraft tow vehicles. Although first aircraft tow vehicle 104 and second aircraft tow vehicle 142 are depicted, in some illustrative examples, a single aircraft tow vehicle connects to main landing gear 106 and tows aircraft 102. For example, an aircraft towing propulsive force system of a single aircraft tow vehicle may provide propulsion to both first wheel 122 and second wheel 154.

As another example, main landing gear 106 can include any desirable quantity of wheel assemblies. Each wheel assembly of main landing gear 106 includes any desirable quantity of wheels. First aircraft tow vehicle 104 and second aircraft tow vehicle 142 can be utilized with either a two wheel per gear aircraft or single axle two-wheel landing gear.

Figure 2:
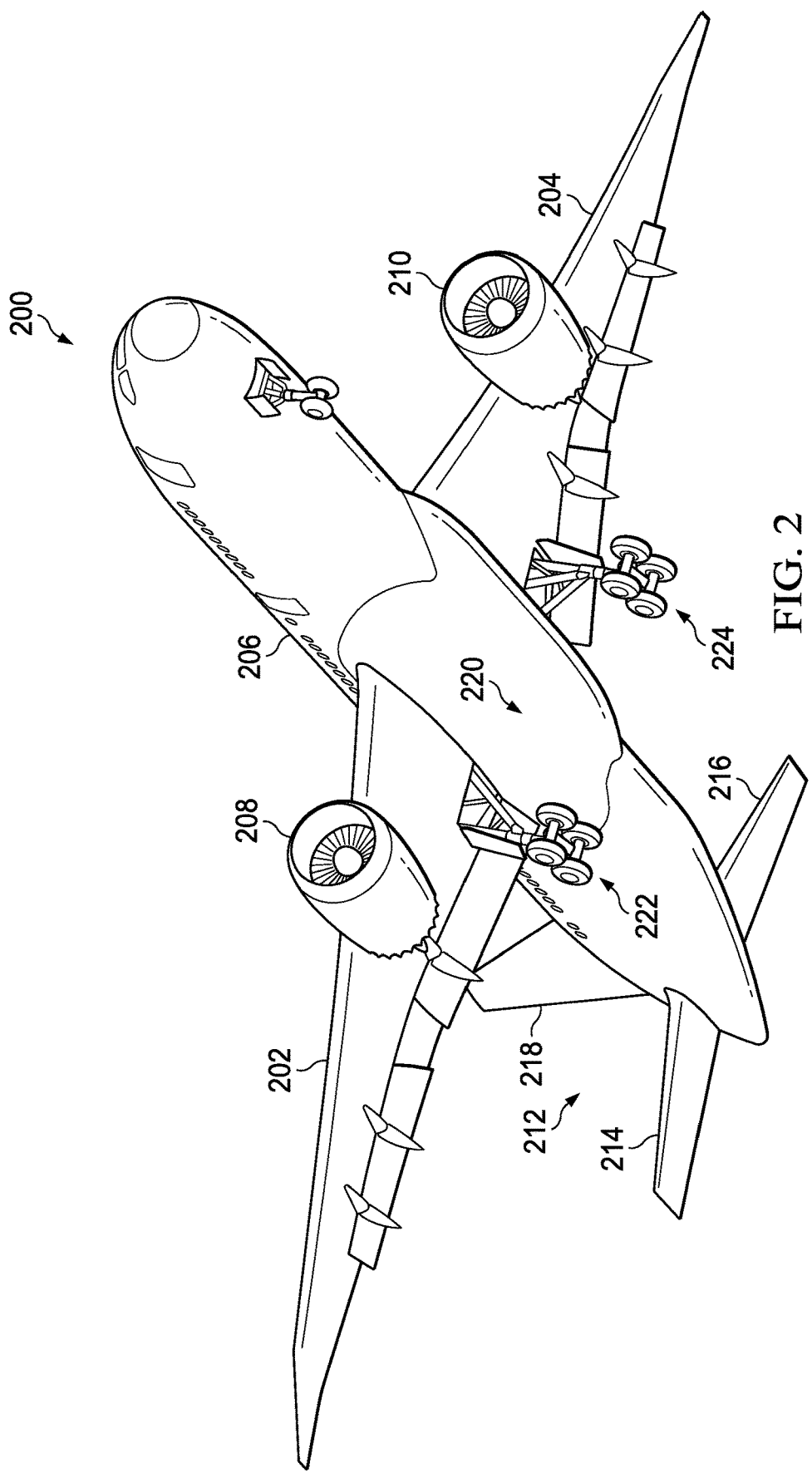
FIG. 2 is an illustration of an underside of an aircraft to be towed in accordance with an illustrative embodiment.

Turning to FIG. 2, an illustration of an underside of an aircraft to be towed is depicted in accordance with an illustrative embodiment. Aircraft 200 is a physical implementation of aircraft 102 of FIG. 1.

In this illustrative example, aircraft 200 has wing 202 and wing 204 attached to body 206. Aircraft 200 includes engine 208 attached to wing 202 and engine 210 attached to wing 204.

Body 206 has tail section 212. Horizontal stabilizer 214, horizontal stabilizer 216, and vertical stabilizer 218 are attached to tail section 212 of body 206.

Aircraft 200 also has main landing gear 220. Aircraft 200 is an example of an aircraft that can be towed at main landing gear 220 in accordance with an illustrative embodiment. Main landing gear 220 includes first wheel assembly 222 and second wheel assembly 226. In some illustrative examples, a first aircraft tow vehicle is connected to first wheel assembly 222 and a second aircraft tow vehicle is connected to second wheel assembly 224 to tow aircraft 200.

Figure 3:
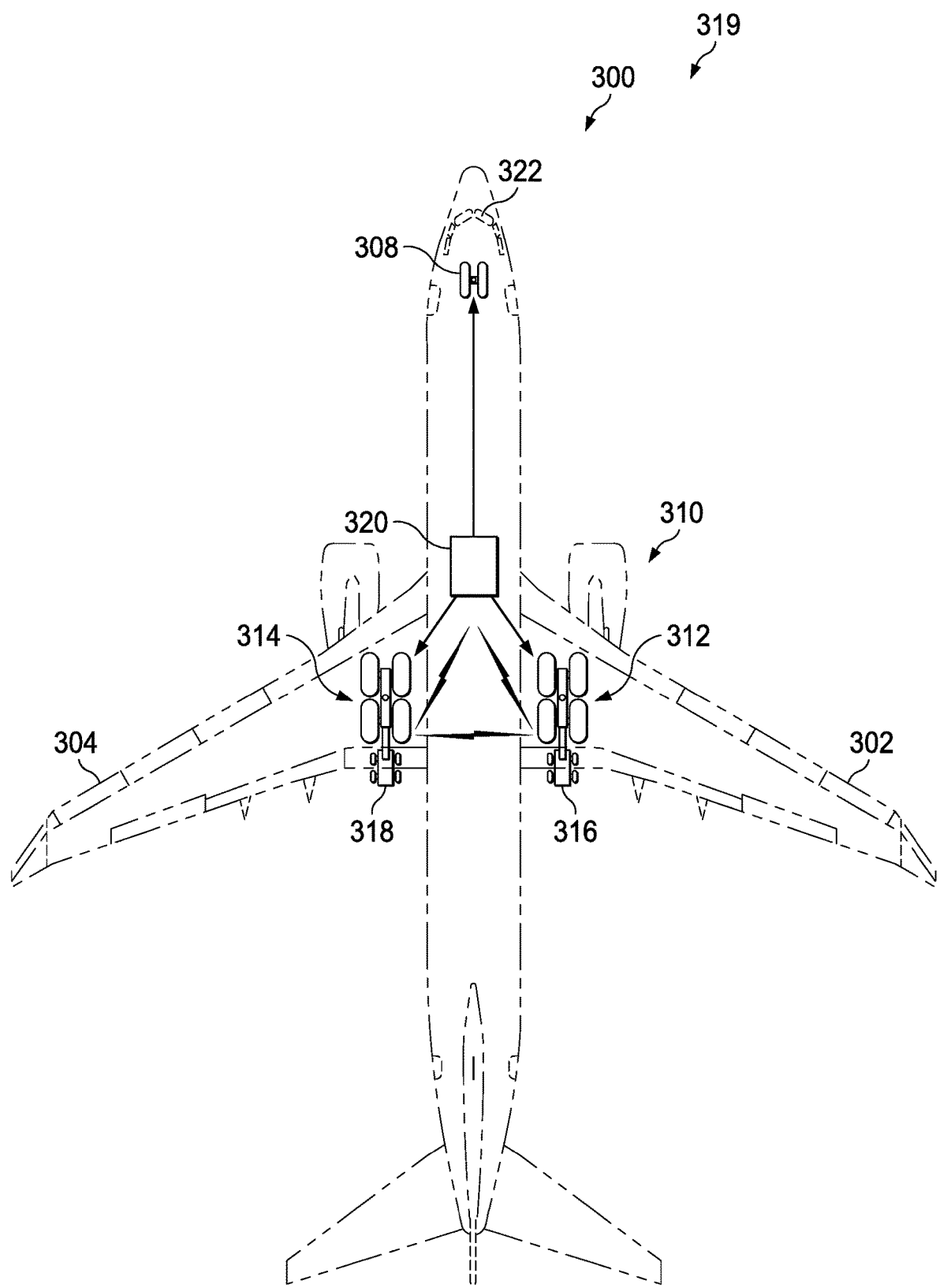
FIG. 3 is an illustration of an outline of an aircraft to be towed and aircraft tow vehicles in accordance with an illustrative embodiment.

Turning to FIG. 3, an illustration of an outline of an aircraft to be towed and aircraft tow vehicles is depicted in accordance with an illustrative embodiment. Aircraft 300 is an outline of aircraft 102 of FIG. 1. In some illustrative examples, aircraft 300 is an outline of aircraft 200. Aircraft 300 has wing 302 and wing 304 attached to body 306. Aircraft 300 also has nose landing gear 308 and main landing gear 310.

Main landing gear 310 includes first wheel assembly 312 and second wheel assembly 314. As depicted, first aircraft tow vehicle 316 and second aircraft tow vehicle 318 are connected to aircraft 102 to tow aircraft 102.

View 319 is a control scheme between robot tow vehicles, first aircraft tow vehicle 316 and second aircraft tow vehicle 318 connected to main landing gear 310, and aircraft 300. First aircraft tow vehicle 316 and second aircraft tow vehicle 318 communicate with each other to maneuver aircraft 300. In some illustrative examples, first aircraft tow vehicle 316 and second aircraft tow vehicle 318 have full authority for unpowered airplanes. In some illustrative examples, for powered airplanes, the movement is coordinated between first aircraft tow vehicle 316, second aircraft tow vehicle 318, and steering and braking system of aircraft 300.

In some illustrative examples, three-way secure wireless link system 320 provides information between each of first aircraft tow vehicle 316, second aircraft tow vehicle 318, and aircraft controls 322. In some illustrative examples, three-way secure wireless link system 320 provides instructions to each of first aircraft tow vehicle 316 and second aircraft tow vehicle 318 based on aircraft controls 322 or a desired towing plan received from an outside source. In some illustrative examples, three-way secure wireless link system 320 drives each of first aircraft tow vehicle 316 and second aircraft tow vehicle 318 based on airplane steering and braking control and flight deck (pilot) directional command from aircraft controls 322.

In some illustrative examples, first aircraft tow vehicle 316 and second aircraft tow vehicle 316 are autonomous or semi-autonomous. In some illustrative examples, first aircraft tow vehicle 316 and second aircraft tow vehicle 316 are autonomous and drive, taking into account information from three-way secure wireless link system 320, without human intervention. In some illustrative examples, first aircraft tow vehicle 316 and second aircraft tow vehicle 316 are semi-autonomous and some functions are controlled or are optionally controlled by an operator. In some illustrative examples, an operator is a pilot of aircraft 300. In some illustrative examples, an operator is an aircraft towing operator.

In some illustrative examples, nose landing gear 308 takes the form of steerable nose gear. In some illustrative examples, nose landing gear 308 takes the form of steerable nose gear which is also casterable.

FIG. 3 is not meant to imply physical or architectural limitations to the manner in which an illustrative embodiment may be implemented. For example, although aircraft 300 is depicted as having three-way secure wireless link system 320, in some other illustrative examples, each of first aircraft tow vehicle 316, second aircraft tow vehicle 318, and aircraft controls 322 communicate directly with each other using secure wireless communication devices.

Design of aircraft 300 is not limiting. First aircraft tow vehicle 316 and second aircraft tow vehicle 318 can be used with a variety of designs of aircraft. As depicted, each of first wheel assembly 312 and second wheel assembly 314 has four wheels. In other non-depicted examples, first wheel assembly 312 has a quantity of wheels different than four. For example, in some designs of an aircraft first wheel assembly 312 and second wheel assembly 314 each has two wheels.

Figure 4:
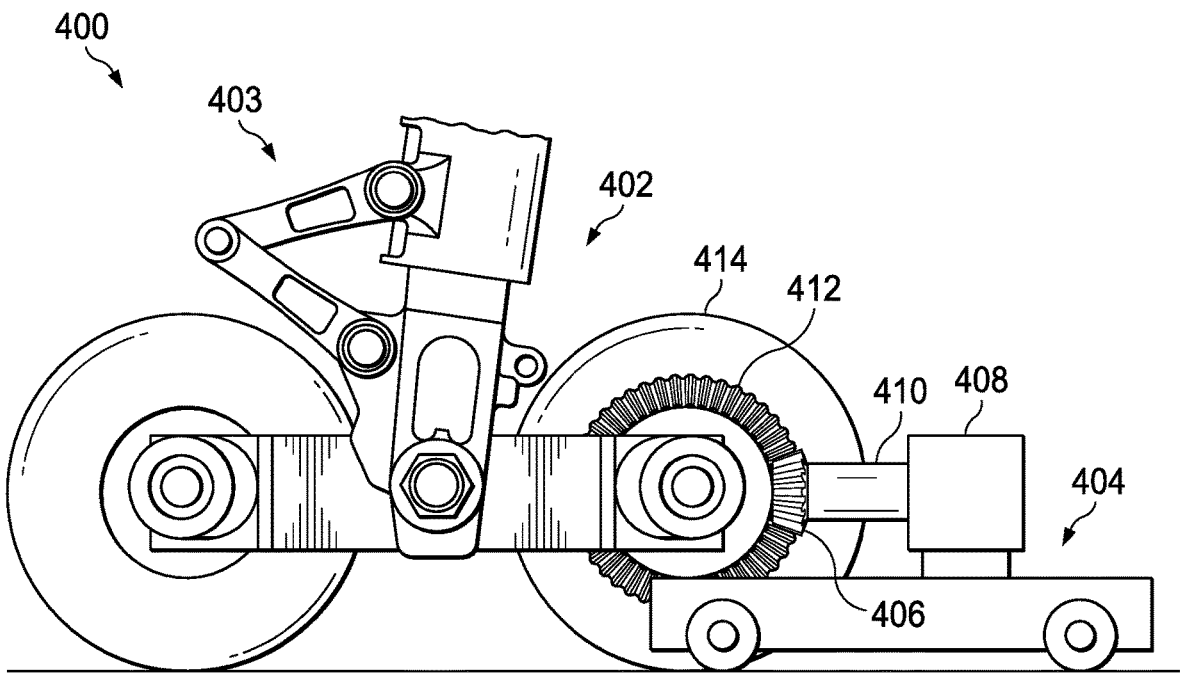
FIG. 4 is an illustration of a side view of an aircraft tow vehicle connected to a wheel assembly of a main landing gear of an aircraft in accordance with an illustrative embodiment.

Turning to FIG. 4, an illustration of a side view of an aircraft tow vehicle connected to a wheel assembly of a main landing gear of an aircraft is depicted in accordance with an illustrative embodiment. View 400 is a cross-section through wheel assembly 402 such that aircraft tow vehicle 404 is visible below wheel assembly 402 of main landing gear 403. Aircraft tow vehicle 404 is a physical implementation of first aircraft tow vehicle 104 of FIG. 1. Aircraft tow vehicle 404 may be an implementation of one of first aircraft tow vehicle 316 or second aircraft tow vehicle 318 of FIG. 3. In one example, wheel assembly 402 is one of first wheel assembly 222 or second wheel assembly 226 of FIG. 2. In one example, wheel assembly 402 is one of first wheel assembly 312 or second wheel assembly 314 of FIG. 3.

Aircraft tow vehicle 404 drives beneath wheel assembly 402 and engages wheel assembly 402 with an aircraft structural interface (not depicted). In view 400, aircraft tow vehicle 404 comprises motor 408 connected to drive shaft 410. Drive shaft 410 turns pinion gear 406. Pinion gear 406 engages gear 412 of wheel 414. By rotating pinion gear 406 by motor 408, aircraft tow vehicle 404 provides propulsion to wheel 414 of main landing gear 403.

The illustration of aircraft tow vehicle 404 in FIG. 4 is not meant to imply physical or architectural limitations to the manner in which an illustrative embodiment may be implemented. Other components in addition to or in place of the ones illustrated may be used. Some components may be unnecessary. For example, drive shaft 410 is an example of an aircraft towing propulsive force system configured to interface with gears of main landing gear 403 and drive wheel 414. In some illustrative examples, at least one of pinion gear 406, motor 408, or drive shaft 410 takes a different form to drive gears of main landing gear 403.

Figure 5:
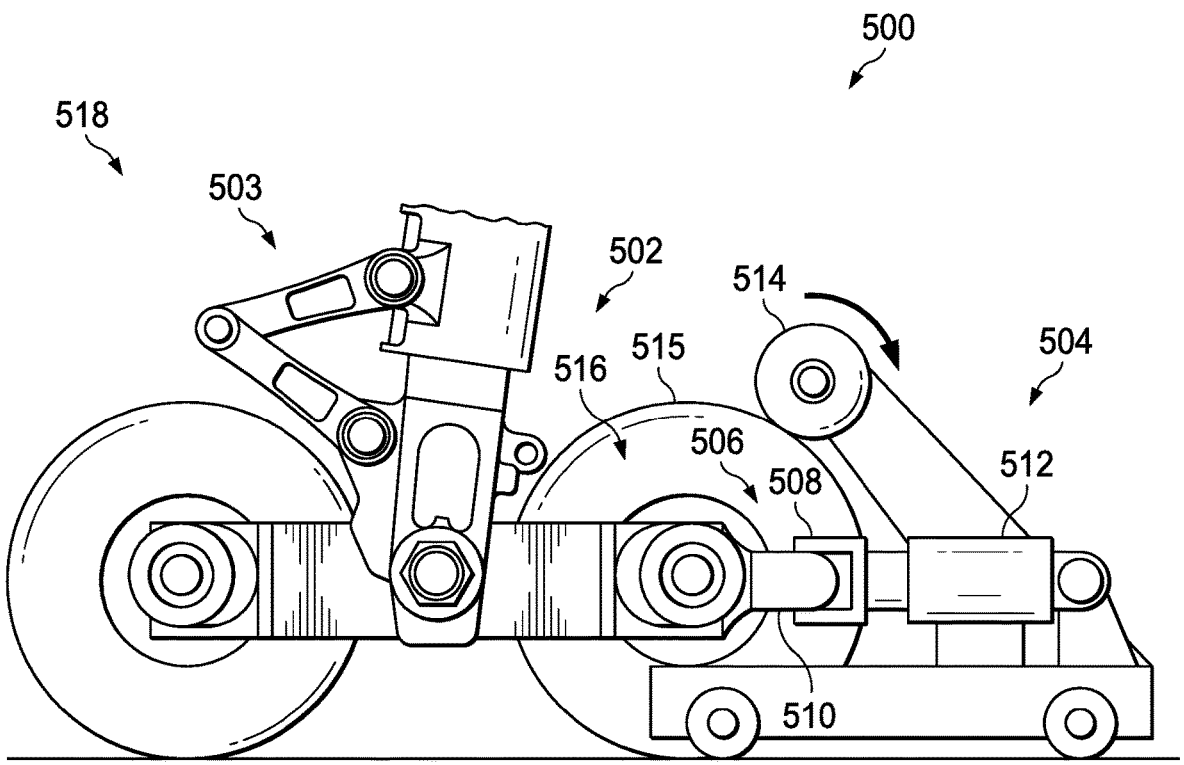
FIG. 5 is an illustration of a side view of an aircraft tow vehicle connected to a wheel assembly of a main landing gear of an aircraft in accordance with an illustrative embodiment.

Turning to FIG. 5, an illustration of a side view of an aircraft tow vehicle connected to a wheel assembly of a main landing gear of an aircraft is depicted in accordance with an illustrative embodiment. View 500 is a cross-section through wheel assembly 502 such that aircraft tow vehicle 504 is visible below wheel assembly 502 of main landing gear 503. Aircraft tow vehicle 504 is a physical implementation of first aircraft tow vehicle 104 of FIG. 1. Aircraft tow vehicle 504 may be an implementation of one of first aircraft tow vehicle 316 or second aircraft tow vehicle 318 of FIG. 3. In one example, wheel assembly 502 is one of first wheel assembly 222 or second wheel assembly 226 of FIG. 2. In one example, wheel assembly 502 is one of first wheel assembly 312 or second wheel assembly 314 of FIG. 3.

Aircraft tow vehicle 504 drives beneath wheel assembly 502 and engages wheel assembly with aircraft structural interface 506. In view 500, aircraft structural interface 506 takes the form of hook 508 configured to connect to towing clevis 510 on main landing gear 503. As depicted, hook 508 is connected to hydraulic cylinder 512 configured to extend hook 508 towards main landing gear 503. Hydraulic cylinder 512 pulls on aircraft tow vehicle 504 such that friction wheel 514 presses substantially against tire 515 of main wheel 516 in order to avoid slippage. Driving friction wheel 514 provides propulsion to main wheel 516. Driving friction wheel 514 provides propulsion to aircraft 518 having main landing gear 503.

Turning to FIG. 6, an illustration of a side cross-sectional view of an aircraft tow vehicle connected to a wheel assembly of a main landing gear of an aircraft is depicted in accordance with an illustrative embodiment. View 600 is a cross-section through wheel assembly 602 such that aircraft tow vehicle 604 is visible below wheel assembly 602 of main landing gear 603. Aircraft tow vehicle 604 is a physical implementation of first aircraft tow vehicle 104 of FIG. 1. Aircraft tow vehicle 604 may be an implementation of one of first aircraft tow vehicle 316 or second aircraft tow vehicle 318 of FIG. 3. Wheel assembly 602 has a different design from wheel assembly 402 of FIG. 4 and wheel assembly 502 of FIG. 5.

Aircraft tow vehicle 604 drives beneath wheel assembly 602 and engages wheel assembly with aircraft structural interface 606. In view 600, aircraft structural interface 606 takes the form of socket 608. Socket 608 is connected to vertical loading system 610. As depicted, vertical loading system 610 takes the form of hydraulic jack 612.

After positioning aircraft tow vehicle 604 beneath wheel assembly 602, aircraft structural interface 606 is extended to engage wheel assembly 602. As depicted, hydraulic jack 612 is extended to engage male connector 614 of wheel assembly 602. Hydraulic jack 612 is then further extended to create normal force 615 against wheel assembly 602. Providing normal force 615 against wheel assembly 602 produced an equal downward force 617 on runway 616 by aircraft tow vehicle 604.

Although not depicted in FIG. 6, in some illustrative examples, a steering system provides steering control of aircraft tow vehicle 604 during towing in order to provide stability in both forward and reverse movement. In some illustrative examples, a sensing mechanism (not depicted) is present to provide controllability of the angle of aircraft tow vehicle 604 relative to a vertical axis parallel to normal force 615.

Downward force 617 on runway 616 by aircraft tow vehicle 604 provides traction for driving wheel 618 of aircraft tow vehicle 604. Downward force 617 on runway 616 by aircraft tow vehicle 604 provides traction for all ground friction variations including wet, dry, and icy conditions. Driving wheel 618 is part of movement system 620 of aircraft tow vehicle 604. Driving wheel 618 provides propulsion to aircraft 622 having main landing gear 603. Driving aircraft tow vehicle 604 using driving wheel 618 provides propulsion to aircraft 622.

In some illustrative examples, normal force 615 also reduces traction between main wheel 624 of wheel assembly 602 and runway 616. Reducing traction between main wheel 624 and runway 616 can reduce wear on main wheel 624 due to movement on runway 616 during towing. In these illustrative examples, the advantage of this system is the reduction in tire wear due to turn scrubbing, because jacking the main landing gear, including main wheel 624, reduces scrubbing wear. Scrubbing wear is wear during turning on main tires, such as main wheel 624.

The ability of aircraft tow vehicle 604 to pivot while underneath main landing gear enables reduction or elimination of scrubbing loads. The ability of aircraft tow vehicle 604 to pivot while underneath main landing gear enables the reduction in tire wear.

Design of wheel assembly 602 is not limiting. Aircraft tow vehicle 604 can be used with a variety of designs of aircraft. As depicted, wheel assembly 602 has two wheels. In other non-depicted examples, a wheel assembly has a quantity of wheels different than two. For example, in some designs of an aircraft, the wheel assembly has four wheels, as in FIGS. 4 and 5. Aircraft tow vehicle 604 can be used to tow a variety of different designs of aircraft. In some illustrative examples, aircraft tow vehicle 604 is used to tow an aircraft with a wheel assembly having two axles and four wheels. In these illustrative examples, aircraft tow vehicle 604 may apply a normal force at a different location of a wheel assembly having two axles and four wheels. In some illustrative examples, aircraft tow vehicle 604 applies a normal force beneath one of the two axles.

The different components shown in FIGS. 2-6 may be combined with components in FIG. 1, used with components in FIG. 1, or a combination of the two. Additionally, some of the components in FIGS. 2-6 may be illustrative examples of how components shown in block form in FIG. 1 may be implemented as physical structures.

Figure 7A:
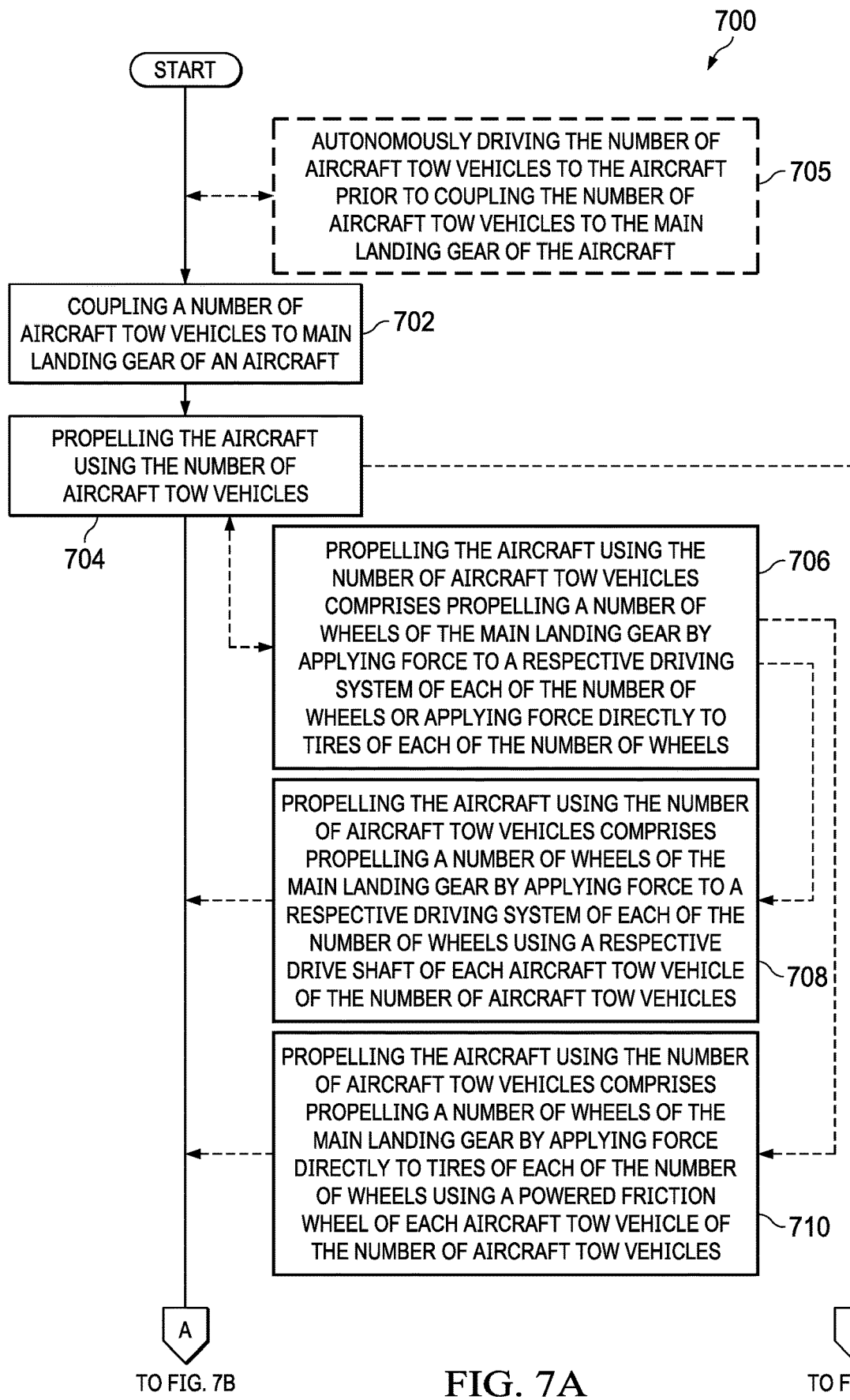
FIGS. 7A-7B are an illustration of a flowchart of a method of towing an aircraft in accordance with an illustrative embodiment.
Figure 7B:
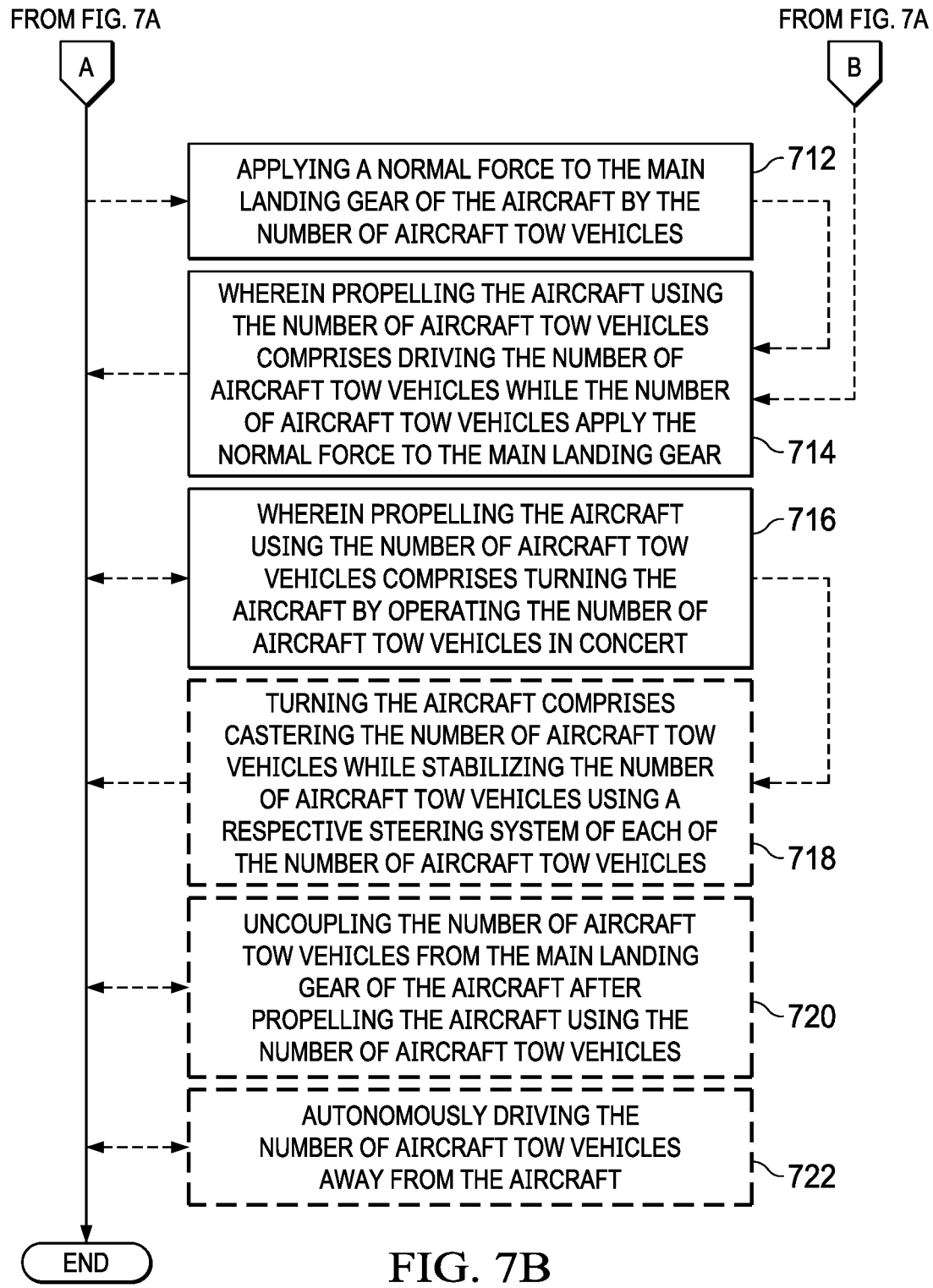

Turning now to FIGS. 7A-7B, an illustration of a flowchart of a method of towing an aircraft is depicted in accordance with an illustrative embodiment. Method 700 may be implemented using first aircraft tow vehicle 104 and aircraft 102 of FIG. 1. Method 700 may be implemented using an aircraft tow vehicle and one of aircraft 200 of FIG. 2 or aircraft 300 of FIG. 3. Method 800 may be implemented by aircraft tow vehicle 404 of FIG. 4. Method 800 may be implemented by aircraft tow vehicle 504 of FIG. 5. Method 800 may be implemented by aircraft tow vehicle 604 of FIG. 6.

Method 700 couples a number of aircraft tow vehicles to main landing gear of an aircraft (operation 702). Method 700 propels the aircraft using the number of aircraft tow vehicles (operation 704). Afterwards, method 700 terminates.

In some illustrative examples, method 700 autonomously drives the number of aircraft tow vehicles to the aircraft prior to coupling the number of aircraft tow vehicles to the main landing gear of the aircraft (operation 705). The number of aircraft tow vehicles are driven by respective movement systems of the number of aircraft tow vehicles.

In some illustrative examples, propelling the aircraft using the number of aircraft tow vehicles comprises propelling a number of wheels of the main landing gear by applying force to a respective driving system of each of the number of wheels or applying force directly to tires of each of the number of wheels (operation 706). In some illustrative examples, propelling the aircraft using the number of aircraft tow vehicles comprises propelling a number of wheels of the main landing gear by applying force to a respective driving system of each of the number of wheels using a respective drive shaft of each aircraft tow vehicle of the number of aircraft tow vehicles (operation 708).

In some illustrative examples, propelling the aircraft using the number of aircraft tow vehicles comprises propelling a number of wheels of the main landing gear by applying force directly to tires of each of the number of wheels using a powered friction wheel of each aircraft tow vehicle of the number of aircraft tow vehicles (operation 710).

In some illustrative examples, method 700 applies a normal force to the main landing gear of the aircraft by the number of aircraft tow vehicles (operation 712), and wherein propelling the aircraft using the number of aircraft tow vehicles comprises driving the number of aircraft tow vehicles while the number of aircraft tow vehicles apply the normal force to the main landing gear (operation 714). In some illustrative examples, propelling the aircraft using the number of aircraft tow vehicles comprises turning the aircraft by operating the number of aircraft tow vehicles in concert (operation 716). In some illustrative examples, turning the aircraft comprises castering the number of aircraft tow vehicles while stabilizing the number of aircraft tow vehicles using a respective steering system of each of the number of aircraft tow vehicles (operation 718).

In some illustrative examples, method 700 uncouples the number of aircraft tow vehicles from the main landing gear of the aircraft after propelling the aircraft using the number of aircraft tow vehicles (operation 720). In some illustrative examples, method 700 autonomously drives the number of aircraft tow vehicles away from the aircraft (operation 722).

Figure 8:
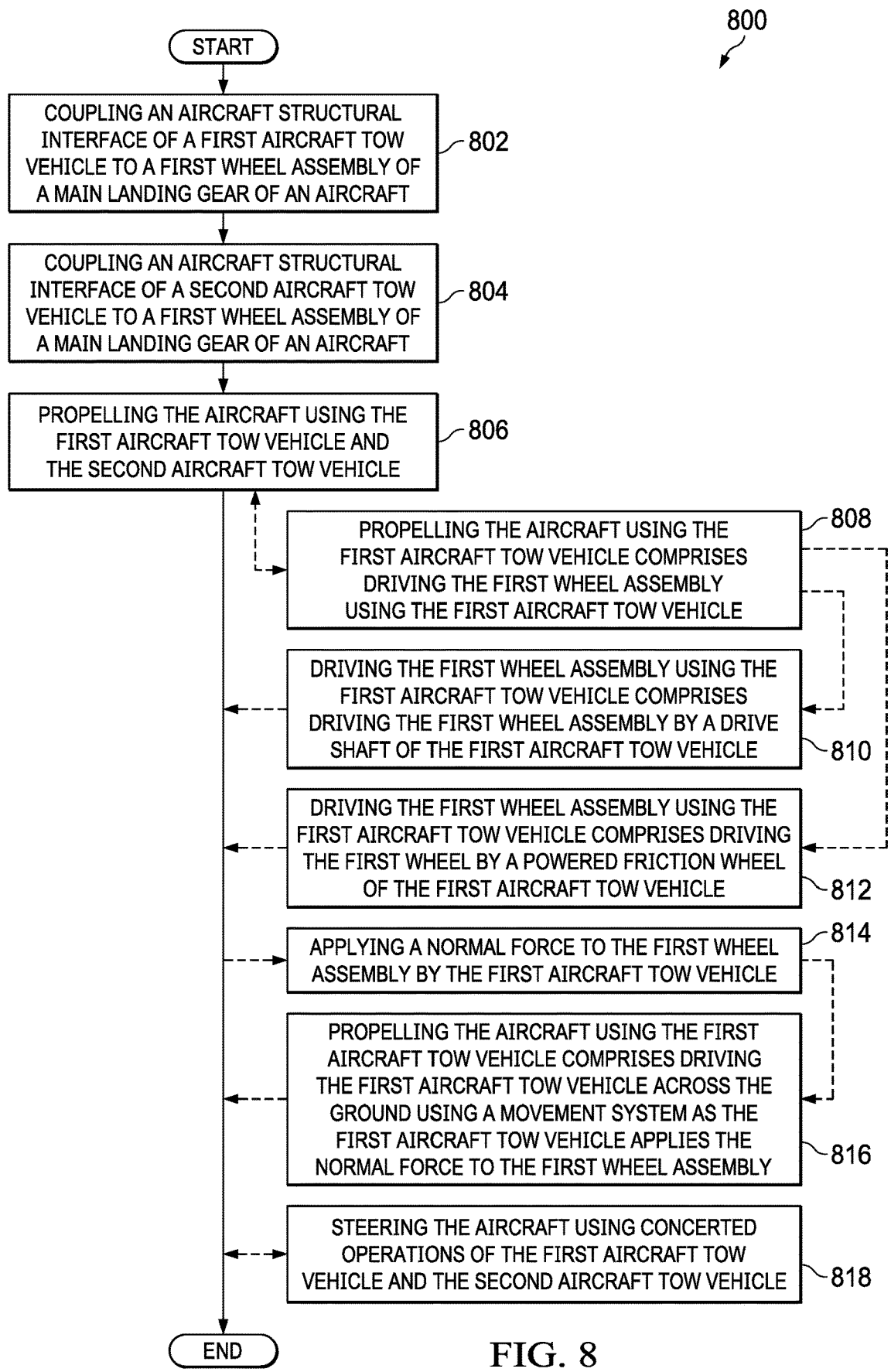
FIG. 8 is an illustration of a flowchart of a method of towing an aircraft in accordance with an illustrative embodiment.

Turning now to FIG. 8, an illustration of a flowchart of a method of towing an aircraft is depicted in accordance with an illustrative embodiment. Method 800 may be implemented using first aircraft tow vehicle 104 and aircraft 102 of FIG. 1. Method 800 may be implemented using an aircraft tow vehicle and one of aircraft 200 of FIG. 2 or aircraft 300 of FIG. 3. Method 800 may be implemented by aircraft tow vehicle 404 of FIG. 4. Method 800 may be implemented by aircraft tow vehicle 504 of FIG. 5. Method 800 may be implemented by aircraft tow vehicle 604 of FIG. 6.

Method 800 couples an aircraft structural interface of a first aircraft tow vehicle to a first wheel assembly of a main landing gear of an aircraft (operation 802). Method 800 couples an aircraft structural interface of a second aircraft tow vehicle to a first wheel assembly of a main landing gear of an aircraft (operation 804). Method propels the aircraft using the first aircraft tow vehicle and the second aircraft tow vehicle (operation 806). Afterwards, method 800 terminates.

In some illustrative examples, propelling the aircraft using the first aircraft tow vehicle comprises driving the first wheel assembly using the first aircraft tow vehicle (operation 808). In some illustrative examples, driving the first wheel assembly using the first aircraft tow vehicle comprises driving the first wheel assembly by a draft shaft of the first aircraft tow vehicle (operation 810). In some illustrative examples, driving the first wheel assembly using the first aircraft tow vehicle comprises driving the first wheel by a powered friction wheel of the first aircraft tow vehicle (operation 812).

In some illustrative examples, method 800 applies a normal force to the first wheel assembly by the first aircraft tow vehicle (operation 814). In some illustrative examples, propelling the aircraft using the first aircraft tow vehicle comprises driving the first aircraft tow vehicle across a ground using a movement system as the first aircraft tow vehicle applies the normal force to the first wheel assembly (operation 816). In some illustrative examples, method 800 steers the aircraft using concerted operations of the first aircraft tow vehicle and the second aircraft tow vehicle (operation 818).

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 706 thorough operation 716 may be optional. As another example, operation 808 thorough operation 818 may be optional.

Figure 9:
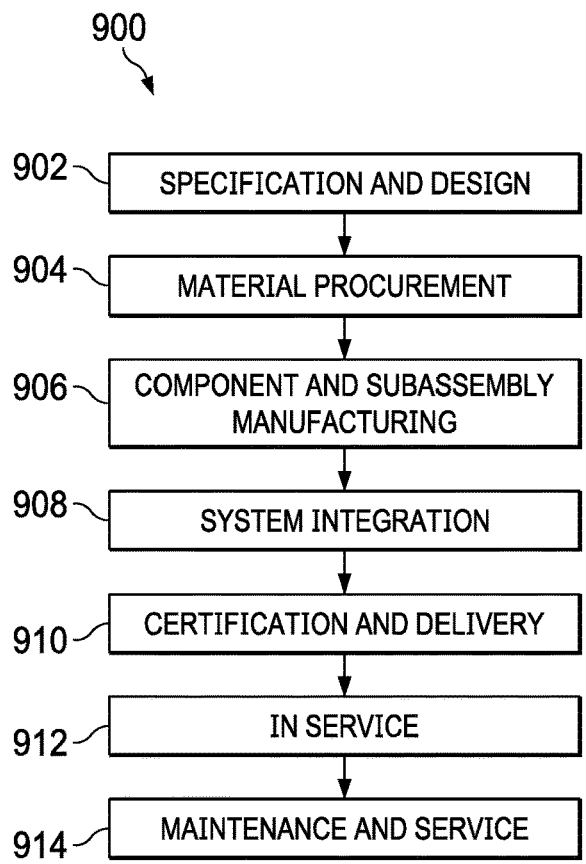
FIG. 9 is an illustration of an aircraft manufacturing and service method in a form of a block diagram in accordance with an illustrative embodiment.
Figure 10:
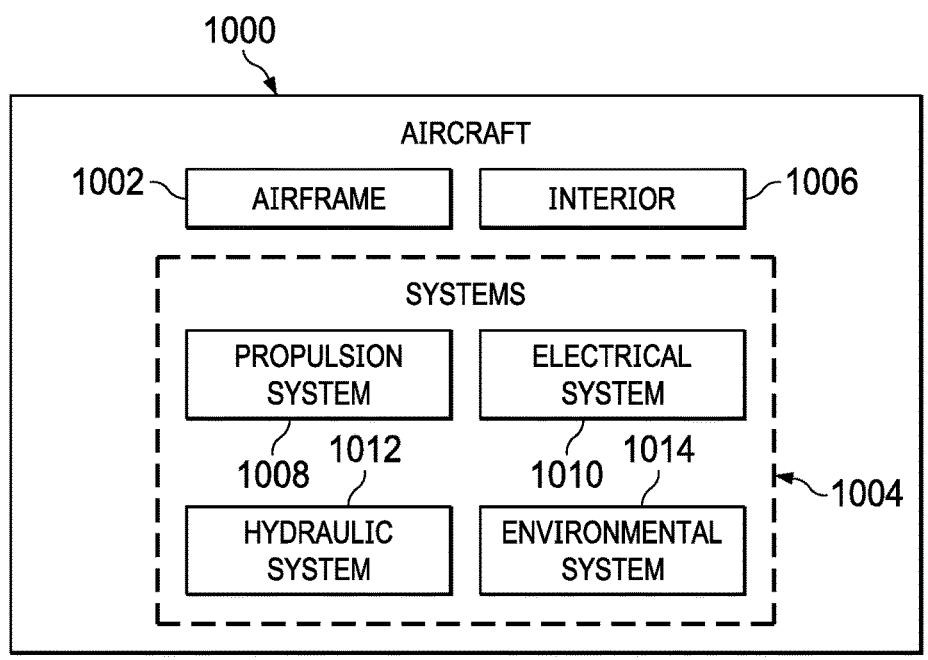
FIG. 10 is an illustration of an aircraft in a form of a block diagram in which an illustrative embodiment may be implemented.

Illustrative embodiments of the present disclosure may be described in the context of aircraft manufacturing and service method 900 as shown in FIG. 9 and aircraft 1000 as shown in FIG. 10. Turning first to FIG. 9, an illustration of an aircraft manufacturing and service method is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 takes place. Thereafter, aircraft 1000 may go through certification and delivery 910 in order to be placed in service 912. While in service 912 by a customer, aircraft 1000 is scheduled for routine maintenance and service 914, which may include modification, reconfiguration, refurbishment, or other maintenance and service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft is depicted in which an illustrative embodiment may be implemented. In this example, aircraft 1000 is produced by aircraft manufacturing and service method 900 of FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included.

Apparatuses and methods embodied herein may be employed during at least one of the stages of aircraft manufacturing and service method 900. One or more illustrative embodiments may be manufactured or used during at least one of component and subassembly manufacturing 906, system integration 908, in service 912, or maintenance and service 914 of FIG. 9. Aircraft 1000 may take the form of aircraft 102. First aircraft tow vehicle 104 can be used to tow aircraft 1000. First aircraft tow vehicle 104 can be used to tow aircraft 1000 during at least one of in service 912 or maintenance and service 914. As an example, method 700 may be used during in service 912 to tow aircraft 1000. As another example, method 800 may be used during in service 912 to tow aircraft 1000.

The illustrative examples present an aircraft tow vehicle and methods of use. The aircraft tow vehicle is substantially smaller than conventional aircraft tugs. The aircraft tow vehicle provides greater maneuverability than conventional aircraft tugs. In some illustrative examples, multiple aircraft tow vehicles perform synchronized movements to tow an aircraft.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of towing an aircraft comprising:
coupling a number of aircraft tow vehicles to main landing gear of an aircraft comprising extending an aircraft structural interface to engage a connector of a wheel assembly of the aircraft;
propelling the aircraft using the number of aircraft tow vehicles; and
applying a normal force to the main landing gear of the aircraft by the number of aircraft tow vehicles comprising producing an equal downward force on, and increasing traction of, wheels of the number of aircraft tow vehicles on a runway, wherein propelling the aircraft using the number of aircraft tow vehicles comprises driving the number of aircraft tow vehicles while the number of aircraft tow vehicles apply the normal force to the main landing gear.

2. The method of claim 1, wherein propelling the aircraft using the number of aircraft tow vehicles comprises propelling a number of wheels of the main landing gear by applying force to a respective driving system of each of the number of wheels or applying force directly to tires of each of the number of wheels.

3. The method of claim 2, wherein propelling the aircraft using the number of aircraft tow vehicles comprises propelling a number of wheels of the main landing gear by applying force to a respective driving system of each of the number of wheels using a respective drive shaft of each aircraft tow vehicle of the number of aircraft tow vehicles.

4. The method of claim 2, wherein propelling the aircraft using the number of aircraft tow vehicles comprises propelling a number of wheels of the main landing gear by applying force directly to tires of each of the number of wheels using a powered friction wheel of each aircraft tow vehicle of the number of aircraft tow vehicles.

5. The method of claim 1, wherein extending an aircraft structural interface to engage a connector of wheel assembly of the aircraft comprises using a hydraulic jack to engage a male connector of the wheel assembly and wherein propelling the aircraft using the number of aircraft tow vehicles comprises turning the aircraft by operating the number of aircraft tow vehicles in concert.

6. The method of claim 5, wherein turning the aircraft comprises castering the number of aircraft tow vehicles while stabilizing the number of aircraft tow vehicles using a respective steering system of each of the number of aircraft tow vehicles.

7. The method of claim 6 further comprising:
autonomously driving the number of aircraft tow vehicles to the aircraft prior to coupling the number of aircraft tow vehicles to the main landing gear of the aircraft;
uncoupling the number of aircraft tow vehicles from the main landing gear of the aircraft after propelling the aircraft using the number of aircraft tow vehicles; and
autonomously driving the number of aircraft tow vehicles away from the aircraft.

8. The method of claim 1 further comprising:
autonomously driving the number of aircraft tow vehicles to the aircraft prior to coupling the number of aircraft tow vehicles to the main landing gear of the aircraft;
uncoupling the number of aircraft tow vehicles from the main landing gear of the aircraft after propelling the aircraft using the number of aircraft tow vehicles; and
autonomously driving the number of aircraft tow vehicles away from the aircraft.

9. A method of towing an aircraft comprising:
coupling a number of aircraft tow vehicles to main landing gear of an aircraft comprising extending an aircraft structural interface to engage a connector of a wheel assembly of the aircraft;
propelling the aircraft using the number of aircraft tow vehicles; and
applying a normal force to the main landing gear of the aircraft by the number of aircraft tow vehicles comprising producing an equal downward force on, and increasing traction of, wheels of the number of aircraft tow vehicles on a runway, wherein propelling the aircraft using the number of aircraft tow vehicles comprises driving the number of aircraft tow vehicles while the number of aircraft tow vehicles apply the normal force to the main landing gear,
wherein propelling the aircraft using the number of aircraft tow vehicles comprises propelling a number of wheels of the main landing gear by applying force directly to tires of each of the number of wheels.

10. The method of claim 9, wherein propelling the aircraft using the number of aircraft tow vehicles comprises propelling a number of wheels of the main landing gear by applying force directly to tires of each of the number of wheels using a powered friction wheel of each aircraft tow vehicle of the number of aircraft tow vehicles.

11. The method of claim 9, wherein extending an aircraft structural interface to engage a connector of wheel assembly of the aircraft comprises using a hydraulic jack to engage a male connector of the wheel assembly and wherein propelling the aircraft using the number of aircraft tow vehicles comprises turning the aircraft by operating the number of aircraft tow vehicles in concert.

12. The method of claim 11, wherein turning the aircraft comprises castering the number of aircraft tow vehicles while stabilizing the number of aircraft tow vehicles using a respective steering system of each of the number of aircraft tow vehicles.

13. The method of claim 12, further comprising:
autonomously driving the number of aircraft tow vehicles to the aircraft prior to coupling the number of aircraft tow vehicles to the main landing gear of the aircraft;
uncoupling the number of aircraft tow vehicles from the main landing gear of the aircraft after propelling the aircraft using the number of aircraft tow vehicles; and
autonomously driving the number of aircraft tow vehicles away from the aircraft.

14. The method of claim 9, further comprising:
autonomously driving the number of aircraft tow vehicles to the aircraft prior to coupling the number of aircraft tow vehicles to the main landing gear of the aircraft;
uncoupling the number of aircraft tow vehicles from the main landing gear of the aircraft after propelling the aircraft using the number of aircraft tow vehicles; and
autonomously driving the number of aircraft tow vehicles away from the aircraft.

15. A method of towing an aircraft comprising:
coupling a number of aircraft tow vehicles to main landing gear of an aircraft comprising extending an aircraft structural interface to engage a connector of a wheel assembly of the aircraft; and propelling the aircraft using the number of aircraft tow vehicles, applying a normal force to the main landing gear of the aircraft by the number of aircraft tow vehicles comprising producing an equal downward force on, and increasing traction of, wheels of the number of aircraft tow vehicles on a runway, and wherein propelling the aircraft using the number of aircraft tow vehicles comprises driving the number of aircraft tow vehicles while the number of aircraft tow vehicles apply the normal force to the main landing gear, wherein propelling the aircraft using the number of aircraft tow vehicles comprises wherein propelling the aircraft using the number of aircraft tow vehicles comprises propelling a number of wheels of the main landing gear by applying force to a respective driving system of each of the number of wheels.

16. The method of claim 15 wherein propelling the aircraft using the number of aircraft tow vehicles comprises propelling a number of wheels of the main landing gear by applying force to a respective driving system of each of the number of wheels using a respective drive shaft of each aircraft tow vehicle of the number of aircraft tow vehicles.

17. The method of claim 15, wherein extending an aircraft structural interface to engage a connector of wheel assembly of the aircraft comprises using a hydraulic jack to engage a male connector of the wheel assembly and wherein propelling the aircraft using the number of aircraft tow vehicles comprises turning the aircraft by operating the number of aircraft tow vehicles in concert.

18. The method of claim 17, wherein turning the aircraft comprises castering the number of aircraft tow vehicles while stabilizing the number of aircraft tow vehicles using a respective steering system of each of the number of aircraft tow vehicles.

19. The method of claim 18, further comprising:
autonomously driving the number of aircraft tow vehicles to the aircraft prior to coupling the number of aircraft tow vehicles to the main landing gear of the aircraft;
uncoupling the number of aircraft tow vehicles from the main landing gear of the aircraft after propelling the aircraft using the number of aircraft tow vehicles; and
autonomously driving the number of aircraft tow vehicles away from the aircraft.

20. The method of claim 15, further comprising:
autonomously driving the number of aircraft tow vehicles to the aircraft prior to coupling the number of aircraft tow vehicles to the main landing gear of the aircraft;
uncoupling the number of aircraft tow vehicles from the main landing gear of the aircraft after propelling the aircraft using the number of aircraft tow vehicles; and
autonomously driving the number of aircraft tow vehicles away from the aircraft.

* * * * *